UNITED STATES PATENT OFFICE.

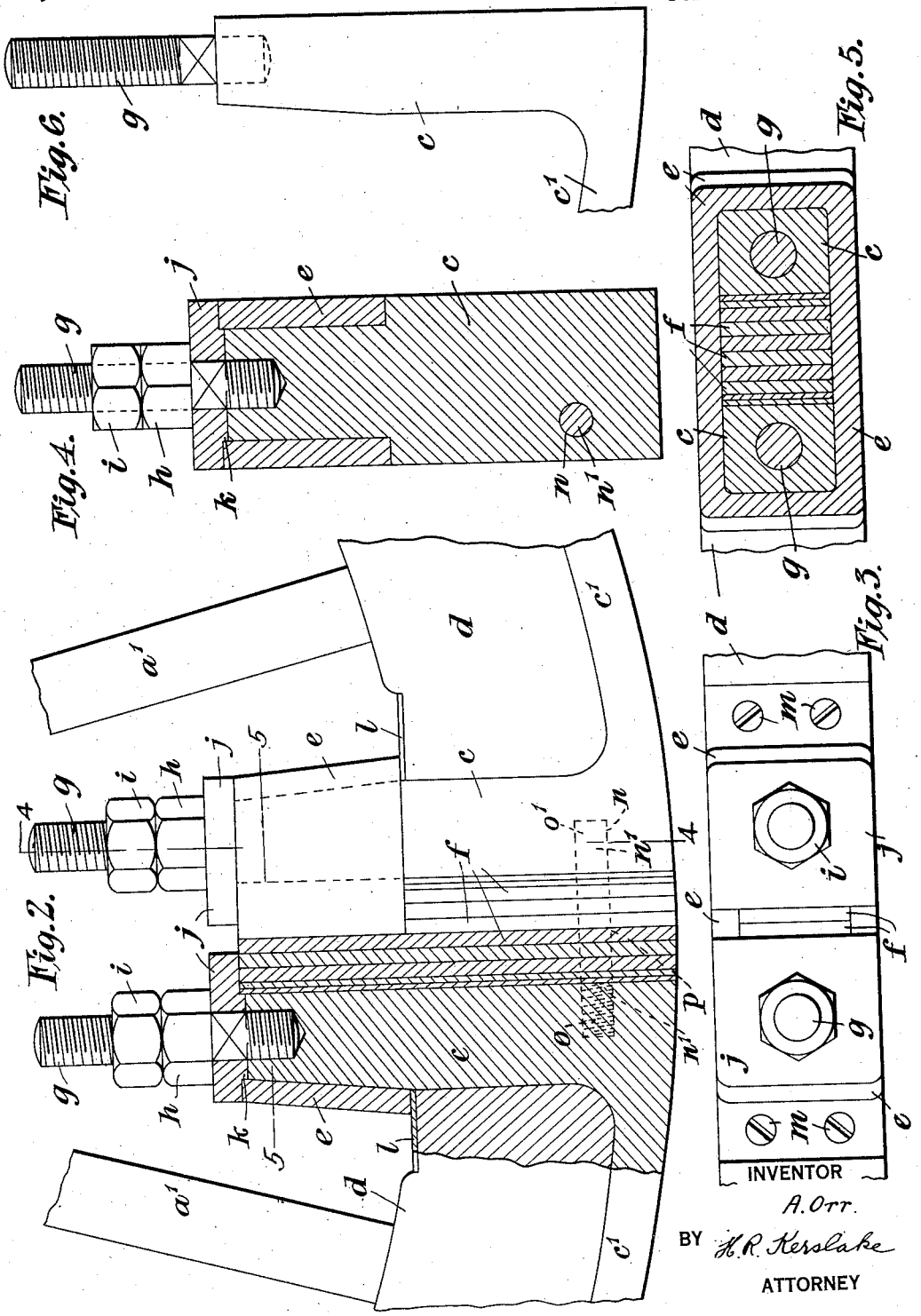

ALEXANDER ORR, OF CHOMA, NORTHERN RHODESIA, SOUTH AFRICA.

TIRE OF ROAD AND LIKE VEHICLES.

1,391,905.  Specification of Letters Patent.  Patented Sept. 27, 1921.

Application filed April 30, 1919. Serial No. 293,754.

*To all whom it may concern:*

Be it known that I, ALEXANDER ORR, a subject of the British Empire, residing at Bonthron Farm, Choma, District of Batoka, Northern Rhodesia, South Africa, have invented certain new and useful Improvements in the Tires of Road and like vehicles, of which the following is a specification.

This invention relates to improvements in metal tires for the wheels of carts, wagons and such like vehicles.

In dry climates the wooden rims or fellies, spokes and hubs of vehicle wheels are subject to considerable contraction resulting in the loosening of the tire which consequently requires tightening or taking up at frequent intervals.

When vehicles with rims of this description are used at a considerable distance from industrial centers or a blacksmith's shop, time is lost and heavy expense incurred in taking them to and from the place where they are to be repaired. The actual repair must of necessity cause considerable delay as the tire has to be removed, a portion taken out and the tire again shrunk on to the felly or rim.

The object of my invention is to enable repairs of this nature to be effected by unskilled labor and at the farm or other place distant from the repair shops.

This object is attained by making the tire in two or more segments. I prefer four, but any suitable number may be used. The end of each segment has a flange or lug of the same width as the tire. The flange projects toward the hub. The inner face of the flange is parallel with the a line drawn from the center of the wheel to the rim. All the segments are of the same construction. The ends of two segments are fixed and held together by means of a removable collar tapered at each end to fit the taper on the outside and/or back of the flanges. This collar is pressed down and held tightly in position by two bolts, studs or pins, which may be either integral with the flange or screwed into same. These bolts are threaded to receive an ordinary lock nut. Movement of these nuts may be further prevented by the insertion of a pin through a hole in the bolt above the nuts. Between the inner parallel faces of the flanges iron or metal removable distance pieces are placed. These may be of any suitable number and thickness.

The two flanges and their bolts and nuts will project toward the center to a distance sufficient to enable them to be manipulated between the spokes. The collar will rest upon washers or metal pieces securely attached to the inside and sunk into the inner side of the rim, and the nuts will also work on metal washers covering a portion of the distance pieces and flange. To prevent movement of these washers a portion may be sunk below the top of the collar.

When the tire requires tightening the nuts pressing upon the rectangular collar are unscrewed and the collar slid toward the center of the wheel. One of the several distance pieces may then be removed and a distance piece of the same thickness is placed between the inside of the collar and the outside of the flange. This distance piece however only extends down and rests upon the washer sunk into the inside of the rim. The collar is then replaced and the whole tightened by screwing down the screws on the bolt.

In each pair of flanges nearest the tire two holes are provided to receive a small screwed pin. Through one or both of the central distance pieces a small pin is screwed with its ends projecting on both sides of the liner sufficiently to rest in the two holes. If desired, the hole in the one flange could be threaded to receive the screwed pin.

The additional distance pieces however are formed with notches or slots instead of holes and are capable of being removed without withdrawing the pin by merely loosening the flanges. The ends of the pin fit snugly in their respective holes when the flanges are drawn together.

If desired however, the pin could be screwed and fixed into the hole in the one flange leaving the other end free to work in the hole in the opposite flange, in which case all the distance pieces would be slotted.

In order that my invention may be clearly understood, I will now describe same with the aid of the accompanying drawings, in which:

Fig. 2 is a section of one flange and elevation of the adjacent flange both shown to an enlarged scale.

Fig. 3 is a plan of a pair of flanges with the spokes removed.

Fig. 4 is a section on the line 4—4 of Fig. 2.

Fig. 5 is a section on line 5—5 of Fig. 2.

Fig. 6 is an elevation of a flange with the stud made integral with the flange.

Like letters indicate similar parts in all the figures.

Figure 1:
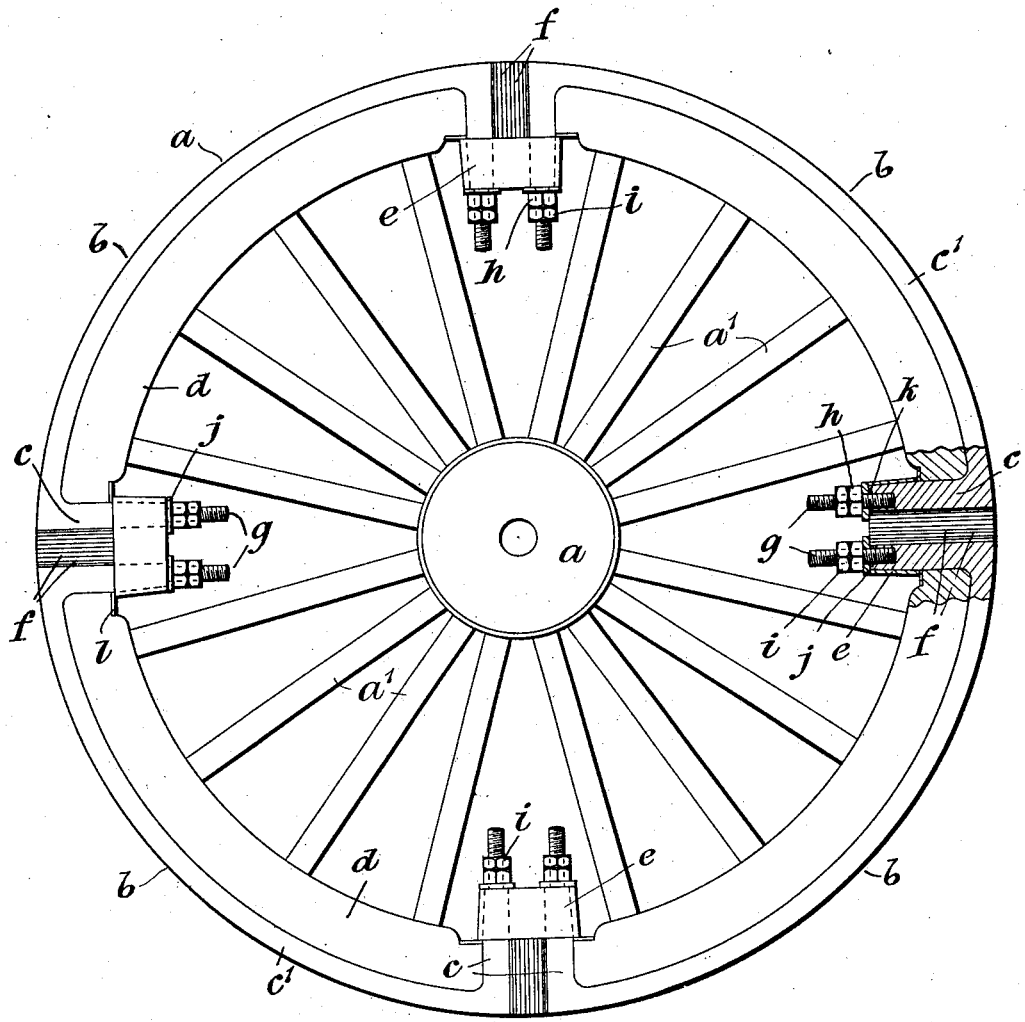
Figure 1 is an elevation of a wheel showing four segments, the opposite flanges of two segments being shown in section.

In Fig. 1 "$a$" represents a wheel having spokes "$a^1$" and four segments "$b$" and eight flanges "$c$". These flanges "$c$", see Fig. 2, are turned up from the tire "$c^1$" in the manner indicated. They are tapered on the outside from the inner periphery of the rim "$d$" toward the hub and are parallel on their inner surfaces for their whole length with a line drawn from the hub to the outside periphery of the rim "$d$," "$e$" is a rectangular collar fitting over the inner portion of the two flanges, flush with the rim on the outside, and "$f$" are the distance pieces of metal or the like, "$g\ g$" are the pins either threaded and screwed into the flanges or made integral with same and "$h$" and "$i$" represent a nut and lock nut respectively for screwing over same, "$j$" is a washer extending over the collar "$e$" and partly over the distance pieces "$f$". This washer "$j$" is of increased thickness at "$k$" sinking below the collar and distance pieces, thus preventing said washer from turning when the nuts are screwed down.

A piece of thin metal "$l$" may be fitted and countersunk on the inner portion of the rim "$d$" partly beneath the collar, to prevent the collar "$e$" being forced into the wooden rim "$d$". This piece of metal may be screwed in place as indicated at "$m$" in Fig. 3. In order to keep the distance pieces "$f$" in place a hole "$n$" shown in dotted lines is drilled in the flanges to receive a pin "$n^1$" threaded at one end as at "$o$" and plain at "$o^1$", or both holes may be plain. A threaded hole, see Fig. 4, is also made in the two central distance pieces "$f$" and a notch, not shown, in the remainder. The pin "$n^1$" is screwed into the holes "$p$" and both ends thereof rest in holes "$o\ o^1$" or one end may be screwed into the threaded hole "$o$". The other distance pieces may be passed in at the side when the collar is removed, the notches in these distance pieces coinciding with the bolt.

As intimated the collar $e$ is forced into engagement with the thin metal piece $l$ and coacts with this piece in clamping the segments $b$ and tire $c^1$ together to increase the rigidity of the device in its entirety. In addition of course the collar fastens the adjacent flanges $c$ together and also maintains the upper portions of the distance pieces against shifting movement.

If owing to excessive vibration the nut and lock nut are insufficient to firmly hold down the collar "$e$" a hole may be drilled in the bolt "$g$" above the nuts and a split pin passed through same.

I claim:

In combination with a wheel rim, a tire composed of a plurality of arcuate sections, radially disposed inwardly extending flanges at the respective ends of the sections, the opposed faces of the adjacent flanges being tapered, a supporting pin arranged between each of the adjacent flanges, a plurality of distance pieces removably arranged between the adjacent flanges and supported by the pin, a plate arranged over the flanges and secured to the inner surface of the rim, a tapered collar engaged with the adjacent flanges and arranged over the plate, and means associated with the flanges for releasably clamping the collar against the plate to rigidly hold the rim with respect to the tire sections in addition to clamping the flanges.

Dated at Pretoria this 7th day of February, 1919.

ALEXANDER ORR.

Witnesses:
M. FORD,
R. EDELSTEIN.